Feb. 14, 1967  J. S. HOLTZCLAW  3,303,559
ELECTRICAL DISCHARGE MACHINE ELECTRODES
Filed May 12, 1965
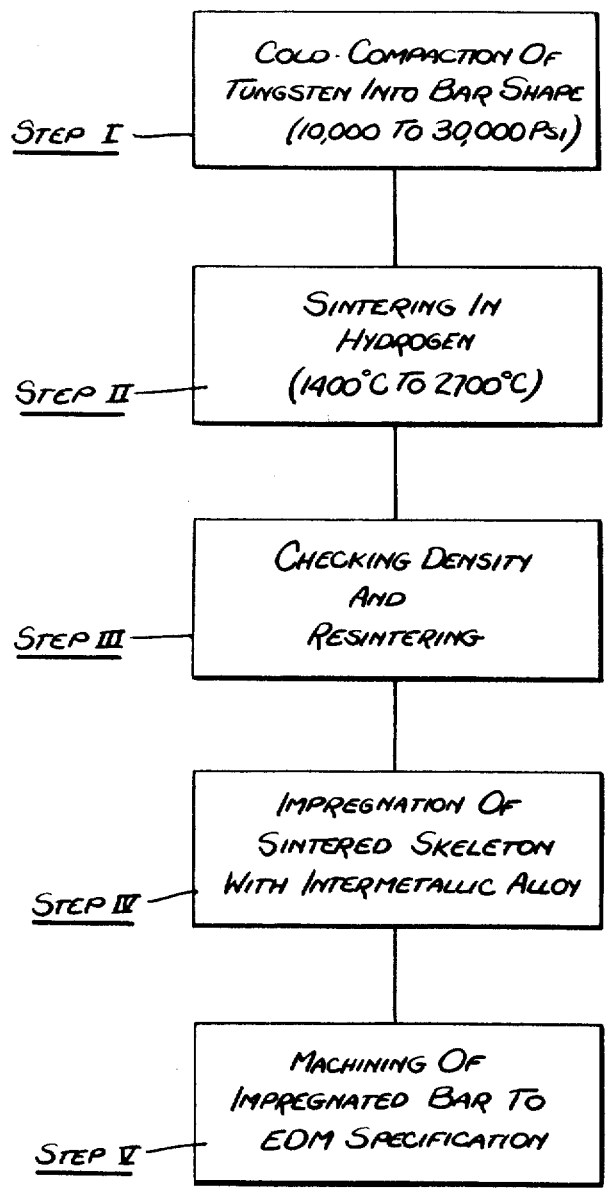
INVENTOR.
J. Sam Holtzclaw
BY
ATTORNEY United States Patent Office 3,303,559
Patented Feb. 14, 1967

3,303,559
ELECTRICAL DISCHARGE MACHINE
ELECTRODES
John Sam Holtzclaw, Clermont, Fla., assignor to
Rametco, Inc., Clermont, Fla.
Filed May 12, 1965, Ser. No. 455,186
12 Claims. (Cl. 29—420.5)

This application is a continuation-in-part of my co-pending application Serial No. 376,074, filed June 18, 1964, and now abandoned.

This invention relates generally to electrodes adapted for electrical discharge machining techniques, and more particularly to electrodes having superior wear ratio and machinability characteristics.

The electrical discharge machining technique is commonly referred to as "EDM." It is based on the controlled erosion of a metal arising from a rapidly recurring spark discharge impinging on the surface being machined. The workpiece melts in a small area surrounding the point at which it is struck by the spark, and a portion of the liquefied or vaporized metal is expelled. This is accomplished by submerging the workpiece and the spark electrode or tool in a dielectric fluid which is circulated to flush away the eroded swarf. The electrode and workpiece separation is maintained by a servomechanism.

The EDM technique is especially useful in fabricating difficult-to-machine parts and in the formation of odd-shaped holes, die cavities and other intricate configurations which defy traditional cutting-tool methods. It is also of great value in certain machining applications where tool force or pressure must be held to a minimum.

Despite the absence of direct contact between the workpiece and the EDM tool, tool wear is the most significant factor in determining the feasibility of the EDM method. Not only does erosion of the workpiece take place when the spark strikes its surface, but the electrode emitting the spark is also subject to attack. For some electrode materials it has been found that electrode wear exceeds workpiece erosion, hence such electrodes are impractical. In order for an EDM electrode to be commercially feasible, the wear ratio must be such that more metal is removed from the workpiece than is extracted from the electrode. The greater this ratio, the more practical the electrode.

The reasons for EDM electrode wear are highly complex, but it has been postulated that as the spark leaps from the electrode to the workpiece, a field is created in which thermal heat and ions flow to attack the electrode structure. Consequently, the higher the melting point of the electrode material, the less it is susceptible to attack.

However, the melting point is not the only factor which must be taken into account in the choice of electrode material. The eroded area of the workpiece assumes a shape which complements that of the electrode. Therefore, as the electrode must be machined to a desired configuration, the machinability of the electrode material is a vital commercial factor. It is for this reason that carbon, which has a high melting temperature nevertheless leaves much to be desired as an EDM material, for carbon is brittle, it is subject to thermal and mechanical shock, and cannot readily be machined to a desired shape.

Accordingly, it is the principal object of this invention to provide an EDM electrode which has superior characteristics both with respect to wear ratio and machinability.

A salient advantage of the invention resides in the fact that the electrode may be inexpensively machined to close tolerances.

More specifically, it is an object of the invention to provide an EDM electrode constituted by a porous sintered skeleton formed of a refractory metal such as tungsten, the pores of which are impregnated with an intermetallic alloy.

Also an object of this invention is to provide a technique for impregnating the porous tungsten skeleton with an intermetallic alloy which technique makes use of a wetting agent to facilitate such impregnation and a reducing agent to effect uniform impregnation.

Also an object of the invention is to provide a uniformly impregnated EDM electrode which is efficient and reliable in operation and which may be mass-produced at low cost.

Briefly stated, these objects are accomplished by first cold-compacting into bar shape, particulates of a refractory metal chosen from the class of tungsten, molybdenum, tantalum and columbium. The cold compact is then sintered in a high-temperature range to provide a rigid, porous skeleton. This skeleton is then impregnated with a molten intermetallic to fill all voids therein, and the resultant body is machined to the desired shape.

In order to effect uniform impregnation, carbon particles are introduced into the skeleton, the particles serving to reduce oxides on the surface of the tungsten, and a wetting agent such as phosphorous is added to the alloy.

Superior wear ratios have been obtained if the intermetallic consists of metal having good electrical conductivity and a different ionization potential, preferably lower, than either the refractory metal or the electrical conductor. It has been found that best results are obtainable with a copper-zinc combination wherein the copper concentration is between 50% to 95% by weight, the balance being zinc.

Not only does the addition of the zinc give better wear ratios than tungsten-copper electrodes lacking this constituent, but it also greatly facilitates machining. It has been found that silver may be substituted for copper in the intermetallic. Other useful intermetallics are set forth in the detailed specification to follow.

For a better understanding of the invention, as well as other objects and features thereof, reference is made to the following detailed specification to be read in conjunction with the drawing showing a flow chart of a process for making an EDM electrode in accordance with the invention.

GENERAL DISCLOSURE

As indicated previously, a new family of EDM electrodes may be made by combining a refractory metal selected from the class of tungsten, molybdenum, tantalum and columbium, with specific intermetallic alloys.

The selected refractory metal in particulate form is processed by powder metallurgical techniques, the first step being to cold-compact the particulates into green bar shape, the green bar thereafter being sintered. Sintering of both tungsten and molybdenum is carried out in a reducing atmosphere such as hydrogen or cracked ammonia, or in a protective atmosphere employing an inert gas such as nitrogen. Other suitable atmospheres may be used with other refractory metals. The sintering temperature range is between 1400° C. and 2700° C., and is preferably in the neighborhood of 2000° C. Below 1400° C., little or no sintering takes place and effective interparticulate bonding does not occur.

It is essential that the sintering temperature be high enough so that the fine refractory particulates join each other to form a very rigid porous structure. Under these conditions, the sintering temperature of the compact is always much higher than the melting point of the intermetallic alloy thereafter used to impregnate the pores. The strength and final sintering density of the bar is a function of the compaction pressure applied to the particulates. In practice, a range of about 10,000 to 30,000 p.s.i. is suitable to produce the desired porous structures. Thus tungsten bars pressed at 16,000 and 20,000 p.s.i. exhibited only about a 1% difference in theoretical density when sintered under exactly the same conditions.

The method set forth below will describe the formation of a porous tungsten structure impregnated with a copper-zinc intermetallic alloy. It is to be understood, however, that apart from the use of appropriate sintering atmospheres, the method is essentially the same for other combinations falling within the scope of the invention.

EXAMPLE OF BASIC METHOD

*Step I.*—Tungsten powders having a mean particle size of 4.5 microns are pressed in a suitable die into bars, using a pressure of 20,000 p.s.i. Such green bars, even without the use of a binder, have sufficient coherence and strength to be handled, and they can be readily shaped by hand tools.

*Step II.*—The green tungsten bars are then loaded into a high-temperature sintering furnace where the temperature is slowly raised to about 2360° C., and maintained at this level for about 20 minutes. It has been found that for 4.5 micron commercial tungsten powders pressed at 20,000 p.s.i. and sintered at 2360° C. for 20 minutes, the resultant structure has a density of 84% of theoretical. It will be appreciated that by proper adjustment of time and sintering temperature parameters, other values of theoretical density may be obtained.

*Step III.*—For purposes of quality control, the porous tungsten bars formed in Step II are weighed first in air and then weighed again when submerged in mercury. From these two values the percentage of theoretical density can be computed. If the percentage falls below the desired amount, the bars can be re-sintered until the requisite value is attained. To insure uniform skeletons, the theoretical density should be held to within plus and minus 2%.

*Step IV.*—The porous sintered tungsten bars are then loaded into a high-temperature impregnation furnace having a hydrogen atmosphere. An amount of copper-zinc alloy (65% Cu–35% Zn, by weight) sufficient to effect complete impregnation is placed around and in contact with the bars. The furnace temperature is then slowly elevated until the alloy becomes molten and starts to wet the porous tungsten skeletons. At this point, the temperature is increased rapidly to 1250° C., which is still well below the sintering temperature of the tungsten. This temperature level is held for about 10 minutes, and as a result, all pores of the tungsten skeleton are filled with the molten copper-zinc alloy. The furnace temperature is then quickly reduced to room temperature.

Alternatively, impregnation may be effected by plunging the porous tungsten bars directly into a molten bath of the intermetallic alloy.

Specifically, for a 65–35 copper-zinc alloy, one may use a silicon carbide or a carbon cupola. The cupola is filled with the alloy in the presence of a gas, or heated in air to about 1000° C. to 1250° C., at which level one detects zinc oxide fumes. The cold refractory bars are then plunged quickly into the molten bath, the bars being completely submerged. After 10 minutes of submersion, the bars are removed, excess alloy shaken off, and the impregnated bars allowed to cool in air. All of the intermetallic alloys listed hereinafter may be melted in a carbon cupola.

*Step V.*—Finally, the tungsten bars impregnated with copper-zinc alloy are machined to the required EDM specifications to produce electrodes which are ready for service and which have optimum wear ratio characteristics.

OTHER EXAMPLES

Basically the same technique is useable in making molybdenum bars impregnated with a copper-zinc alloy. But since molybdenum has a lower melting point than tungsten, the sintering temperature and time parameters must be reduced accordingly. Tantalum and columbium must be sintered and impregnated in vacuo or in an inert atmosphere, for these metals form hydrides in the presence of hydrogen, but in all other respects the process is the same. In no event does the sintering temperature go below 1400° C., which is well above the melting temperature of the intermetallic alloy.

For EDM electrodes the density of the porous refractory metal bars can be varied over rather wide limits by using either a lower or higher compacting pressure, a coarser or finer refractory powder, a lower or higher sintering temperature (provided it does not fall below 1400° C.), and either a shorter or longer sintering time. A practical density range for the porous refractory bar is between 50–88 percent of theoretical. Above 88% of theoretical density, the number of non-interconnecting pores increases very rapidly and impregnation with the intermetallic alloy is rendered difficult. Below 50% of theoretical density the mechanical strength of the porous refractory bars is poor.

Molten copper as well as silver mix in all proportions from 100% zinc to 100% copper, may be used. Superior EDM electrodes can be made within the range of 95–50% copper by weight, the balance zinc. The optimum concentration is about 65% copper by weight, the balance zinc. Since this ratio is a standard brass composition, it can be purchased commercially. The optimum silver-zinc concentration is approximately the same.

In addition to copper-zinc alloys, twenty other intermetallics have been found to give improved wear ratios when rigid porous refractory bars of tungsten, molybdenum, tantalum and columbium were impregnated with them, in accordance with the invention. The percentage ratios of the two metals in the following list of intermetallics are all by weight.

Copper-gallium (95–50% copper)
Copper-germanium (95–50% copper)
Copper-indium (95–70% copper)
Copper-lanthanum (95–50% copper)
Copper-magnesium (95–50% copper)
Coper-manganese (95–50% copper)
Copper-lithium (99–85% copper)
Copper-antimony (95–30% copper)
Copper-silicon (98–85% copper)
Copper-thorium (95–20% copper)
Copper-titanium (95–70% copper)
Copper-zirconium (95–60% copper)
Copper-tin (95–70% copper)
Copper-lead (95–50% copper)
Copper-aluminum (95–85% copper)
Copper-beryllium (99–85% copper)
Copper-bismuth (95–70% copper)
Copper-calcium (95–85% copper)
Copper-cerium (95–70% copper)
Copper-cadmium (95–70% copper)

In the above intermetallic alloys, copper may be replaced by silver without materially altering the results. All the intermetallics permit porous refractory metal bars to be machined more readily than, for example, tungsten-copper or the commercial electrodes identified as Mallory 10W3. It is believed that the reason for this is that all intermetallics tend to be more brittle than pure metal.

TEST RESULTS

A comparative study of the EDM electrodes made in accordance with the invention and several commercially available electrodes, has yielded the following results when using the following EDM equipment and workpiece samples.

Machine:
   Commercial Elox machine.
   Current, 15 amperes.
   Time of test, 5 minutes.

Samples:
   (1) Alloy M252 [1] (jet engine alloy). Composition: C, 1%; Ni, 53%; Cr, 19%; Co, 10%; Mo, 10%; Fe, 25%; Ti, 2.5%; Al, 0.75%.
   (2) G.E. tungsten carbide, grade 883.

[1] Alloy M252 has a reputation of being most difficult to EDM.

RESULTS

ALLOY M252

| Electrode | Milligrams Lost by Electrode Cutting Sample | Milligrams Cut From Sample | Wear Ratio |
|---|---|---|---|
| Brass [1] | 1,050 | 2,360 | 2.25 |
| Mallory 10W3 [2] | None | None | 0.00 |
| 84WZ4.5 [3] | 130 | 1,350 | 10.38 |
| 75MZ4.5 [4] | 180 | 2,250 | 12.5 |

G.E. CARBIDE 883

| Electrode | Milligrams Lost by Electrode Cutting Sample | Milligrams Cut From Sample | Wear Ratio |
|---|---|---|---|
| Brass [1] | 4,070 | 1,087 | 0.26 |
| Mallory 10W3 [2] | 840 | 3,010 | 3.58 |
| 84WZ4.5 [3] | 1,270 | 4,950 | 3.89 |
| 75MZ4.5 [4] | 920 | 4,950 | 5.38 |

[1] Brass electrode used for these tests was ordinary yellow brass most commonly used by EDM operators.

[2] Mallory 10W3 is a tungsten-copper composite commonly used by many EDM operators. It is made by mixing tungsten and copper powders together, pressing the mixture into a bar, and then sintering the bar in hydrogen at a temperature of about 100° C. above the melting point of copper. Essentially it is a bar of porous tungsten powder held together by copper.

[3] 84WZ4.5 electrode consisted of an 84% porous tungsten body made from 4.5 micron powder, pressed at 20,000 p.s.i., sintered at 2,360° C. for a sintering time of 20 minutes, and then impregnated with an alloy of 65% copper by weight, balance zinc, in accordance with the invention.

[4] 75MZ4.5 electrode consisted of a 75% porous molybdenum body made from 4.5 micron powder, pressed at 20,000 p.s.i., sintered at 1,650° C. for 15 minutes, and then impregnated with an alloy of 65% copper by weight, balance zinc, in accordance with the invention.

IMPROVED METHOD

In impregnating the porous tungsten bar with copper-zinc or other intermetallic alloys as disclosed herein, difficulty is sometimes experienced in obtaining uniform impregnation. While in practice some bars were uniformly impregnated, others contained hard spots which either had no impregnant or only a small amount. In order to effect uniform impregnation two corrective steps were taken, namely the use of a wetting agent to increase the fluidity and wetting characteristics of the copper-zinc alloy or other intermetallic, and the use of a reducing agent to reduce oxides on the surface of the tungsten which interferes with the wetting action during impregnation.

In order to increase the fluidity and wetting characteristics of the copper-zinc alloy, it was found advantageous to add a small amount of phosphorous thereto. In practice, to make a 79% copper–20% zinc–1% phosphorous alloy, there is added a calculated weight of commercially available 85% copper–15% phosphorous alloy to the appropriate amount of copper and zinc.

It has been found that percentages of phosphorous between 0.1% and 5% by weight give adequate wetting characteristics, with 1% being about optimum.

Thus there is now used 79% copper–20% zinc–1% phosphorous rather than 65% copper–35% zinc as the intermetallic alloy as in the previously given example.

The amount of zinc was reduced from 35% to 20% because the evaporation of zinc was excessive at the impregnation temperature (Step IV). It was estimated that so much zinc was distilled off during impregnation that the effective composition ended up about 80% Cu–20% Zn in the porous tungsten. However, there was no substantial change in the EDM performance of such electrodes.

It was also found that freshly sintered tungsten bars impregnated more uniformly than old bars and it was determined that the reason for this was that the old bars had through oxygen absorption developed a thick oxide layer which then hindered impregnation. In order to overcome this drawback, fine carbon particles were interspersed within the porous tungsten, the particles acting to reduce the oxide layer when heated in a hydrogen atmosphere. Such a reduction will occur when the porous bar is impregnated with the molten alloy.

A convenient way of introducing carbon into porous tungsten bars is by vacuum impregnation, using a solution of a coal tar in a chlorinated solvent, and then removing the excess solvent by evaporation. A satisfactory composition for this purpose is 5% by weight of plicene (a coal tar product) in tetrachloroethylene (a dry cleaning solvent). Any black coal tar pitch, even road tar in a hydrocarbon solvent such as gasoline is a satisfactory source of carbon. Thus in practice the tungsten bars are carbon impregnated after Step III but before Step IV.

By the use of the reducing and wetting agents uniformity of impregnation is improved, this being important for a marketable EDM electrode must be uniform from bar to bar and lot to lot.

While I have shown preferred embodiments of electrical discharge machine electrodes in accordance with the invention, it will be appreciated that many changes and modifications may be made therein without, however, departing from the essential spirit of the invention as defined in the annexed claims.

What I claim is:

1. The method of fabricating an EDM electrode, comprising the steps of compacting particulates of a refractory metal selected from the class consisting of tungsten, molybdenum, tantalum and columbium, sintering said compact to produce a porous blank, impregnating the porous blank with a reducing agent to reduce oxides on the surface thereof, impregnating the pores of said blank with a molten intermetallic alloy having a relatively high electrical conductivity and a lower melting point than the sintering temperature of said refractory metal, said alloy having a wetting agent added thereto to increase the fluidity thereof and thereby facilitate impregnation, and machining the impregnated blank to a desired electrode shape.

2. The method as set forth in claim 1, wherein said intermetallic alloy is selected from the class consisting of the following alloys wherein the relative percentage of the metals is by weight: copper-zinc (95% to 50% copper), copper-gallium (95% to 50% copper), copper-germanium (95% to 50% copper), copper-indium (95% to 70% copper), copper-lanthanum (95% to 50% copper), copper-lithium (99% to 85% copper), copper-magnesium (95% to 50% copper), copper-manganese (95% to 50% copper), copper-antimony (95% to 30% copper), copper-silicon (98% to 85% copper), copper-thorium (95% to 20% copper), copper-titanium (95% to 70% copper), copper-zirconium (95% to 60% copper), copper-tin (95% to 70% copper), copper-lead (95% to 50% copper), copper-aluimnum (95% to 85% copper), copper-beryllium (99% to 85% copper), copper-bismuth (95% to 70% copper), copper-calcium (95% to 85% copper), copper-cerium (95% to 70% copper), copper-cadmium (95% to 70% copper).

3. The method as set forth in claim 1, wherein said compaction is in a pressure range of 16,000 to 20,000 p.s.i.

4. The method as set forth in claim 1, wherein said porous blank has a density of between 50% to 88% of theoretical.

5. The method as set forth in claim 1, wherein sintering is carried out in a temperature range of 1400° C. to 2700° C.

6. The method as set forth in claim 1, wherein said particulates have a mean particle size of 4.5 microns and are compacted at 20,000 p.s.i.

7. The method as set forth in claim 1, wherein said compact is sintered at about 2360° C.

8. The method as set forth in claim 1, wherein said porous blank is impregnated by immersion.

9. The method as set forth in claim 1, wherein said tungsten compact is sintered in a hydrogen atmosphere.

10. The method as set forth in claim 1, wherein between 0.1 to 5% of phosphorous is added as a wetting agent to said alloy.

11. The method as set forth in claim 1, wherein said porous tungsten blank is treated before impregnation to introduce fine carbon particles therein, thereby to reduce any oxide layer on the tungsten during the impregnation step.

12. The method of fabricating an EDM electrode comprising the steps of:

(a) compacting tungsten particulates to produce a bar shaped blank,
(b) sintering said blank to produce a rigid porous blank,
(c) impregnating said blank with a coal product in a solvent and removing the solvent to deposit carbon particles in the pores, and then
(d) impregnating the blank with a molten alloy of copper and zinc to which a wetting agent is added to facilitate impregnation.

References Cited by the Examiner
UNITED STATES PATENTS

| | | | |
|---|---|---|---|
| 1,552,184 | 9/1925 | Adams | 29—182.1 |
| 2,160,659 | 5/1939 | Hensel | 29—182.1 |
| 2,180,988 | 11/1939 | Lemmers et al. | 29—182.1 X |
| 2,612,443 | 9/1952 | Goetzel et al. | 29—182.1 X |
| 3,069,757 | 12/1962 | Beggs et al. | 29—182.1 |

CARL D. QUARFORTH, *Primary Examiner.*

BENJAMIN R. PADGETT, *Examiner.*

M. J. SCOLNICK, *Assistant Examiner.*